United States Patent
Oe (10) Patent No.: US 11,861,770 B2
(45) Date of Patent: Jan. 2, 2024

(54) IMAGE PROCESSING APPARATUS, IMAGE PROCESSING METHOD, AND PROGRAM FOR CHANGING IMAGE DATA FROM AN INITIAL DISPLAY RANGE TO A TARGET DISPLAY RANGE

(71) Applicant: SONY INTERACTIVE ENTERTAINMENT INC., Tokyo (JP)

(72) Inventor: Kuniaki Oe, Tokyo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 0 days.

(21) Appl. No.: 17/617,900

(22) PCT Filed: Jul. 1, 2020

(86) PCT No.: PCT/JP2020/025905
§ 371 (c)(1),
(2) Date: Dec. 9, 2021

(87) PCT Pub. No.: WO2021/006160
PCT Pub. Date: Jan. 14, 2021

(65) Prior Publication Data
US 2022/0262053 A1    Aug. 18, 2022

(30) Foreign Application Priority Data
Jul. 11, 2019  (JP) ................. 2019-129580

(51) Int. Cl.
*G06T 11/60* (2006.01)
*G06T 11/40* (2006.01)
(Continued)

(52) U.S. Cl.
CPC .............. *G06T 11/60* (2013.01); *G06T 11/40* (2013.01); *G09G 5/377* (2013.01); *G09G 5/38* (2013.01); *G09G 5/391* (2013.01)

(58) Field of Classification Search
CPC ......... G06T 11/60; G06T 11/40; G09G 5/377; G09G 5/38; G09G 5/391; G09G 5/363; G09G 2340/04
See application file for complete search history.

(56) References Cited

U.S. PATENT DOCUMENTS

| | | | | |
|---|---|---|---|---|
| 5,870,085 A | * | 2/1999 | Laksono | G09G 5/393 345/551 |
| 6,236,390 B1 | * | 5/2001 | Hitchcock | G09G 5/24 345/694 |

(Continued)

FOREIGN PATENT DOCUMENTS

| | | |
|---|---|---|
| JP | 5-250468 A | 9/1993 |
| JP | 2003-51029 A | 2/2003 |

(Continued)

OTHER PUBLICATIONS

Notice of Reasons for Refusal dated May 24, 2022, from Japanese Patent Application No. 2021-530654, 3 sheets.

(Continued)

*Primary Examiner* — Jin Cheng Wang
(74) *Attorney, Agent, or Firm* — XSENSUS LLP (57) ABSTRACT

An image processing apparatus sets a target display range, uses information of the set target display range to execute a rasterization process based on image data to generate a bitmap image of a size represented by integerized information, and draws the generated bitmap image in the set target display range.

18 Claims, 3 Drawing Sheets

(51) Int. Cl.
G09G 5/377 (2006.01)
G09G 5/38 (2006.01)
G09G 5/391 (2006.01)

(56) References Cited

U.S. PATENT DOCUMENTS

| | | | | |
|---|---|---|---|---|
| 6,339,426 B1* | 1/2002 | Lui | ............ | G09G 5/227 |
| | | | | 345/469.1 |
| 2004/0183817 A1* | 9/2004 | Kaasila | ............ | G06F 16/9577 |
| | | | | 345/698 |
| 2006/0146075 A1* | 7/2006 | Weiss | ............ | G06T 3/40 |
| | | | | 382/269 |
| 2007/0188497 A1* | 8/2007 | Dowling | ............ | G09G 5/24 |
| | | | | 345/469 |
| 2011/0055694 A1* | 3/2011 | Matsui | ............ | G06K 15/005 |
| | | | | 715/274 |
| 2012/0188286 A1* | 7/2012 | Groth | ............ | G06F 3/0481 |
| | | | | 345/670 |
| 2016/0042545 A1* | 2/2016 | Hiraki | ............ | G06F 3/14 |
| | | | | 345/619 |
| 2017/0018057 A1* | 1/2017 | Hitosugi | ............ | G06T 11/60 |
| 2017/0274285 A1 | 9/2017 | Aguilar | | |
| 2019/0369929 A1* | 12/2019 | Yokouchi | ............ | G06F 3/1243 |
| 2020/0251074 A1* | 8/2020 | Suryanarayana | ... | G06F 3/04845 |

FOREIGN PATENT DOCUMENTS

| | | |
|---|---|---|
| JP | 2003-337958 A | 11/2003 |
| JP | 2006268649 A | 10/2006 |
| JP | 2007-65039 A | 3/2007 |
| JP | 2010-108389 A | 5/2010 |

OTHER PUBLICATIONS

International Search Report and Written Opinion dated Sep. 8, 2020, from PCT/JP2020/025905, 9 sheets.

* cited by examiner

IMAGE PROCESSING APPARATUS, IMAGE PROCESSING METHOD, AND PROGRAM FOR CHANGING IMAGE DATA FROM AN INITIAL DISPLAY RANGE TO A TARGET DISPLAY RANGE

TECHNICAL FIELD

The present invention relates an image processing apparatus, an image processing method, and a program.

BACKGROUND ART

In personal computers, home-use game machines, portable telephone sets, and other various kinds of electronic equipment, displaying of image data is performed. Here, as image data to be displayed, data such as vector data which is supposed to be displayed after being converted into a bitmap image by a process called rasterization is also used.

Also in a case in which the drawing range is to be scaled, by performing rasterization of vector data according to the drawing range, the vector data can be converted into image data with little deterioration in quality in comparison with that in an alternative case in which one bitmap image is scaled. However, since the rasterization of vector data is a process of high load, it is not realistic that, when animation drawing is performed while the size or the position of a drawing range is changed, the rasterization process is performed every time according to the drawing range being changed.

Therefore, it has conventionally been a countermeasure to perform, for vector data, a rasterization process according to a display range planned originally to acquire a bitmap image and then scale or move the bitmap image to a size or a position of an actual drawing range to perform drawing.

SUMMARY

Technical Problem

However, according to the method of the conventional example described above, depending upon the degree of scaling or the like, image data is deteriorated by blurring or the like.

The present invention has been made in view of such an actual situation as described above, and it is one of objects of the present invention to provide an image processing apparatus, an image processing method, and a program by which, when animation drawing is performed or in a like case, while increase of the processing load by rasterization is suppressed, deterioration of image data to be drawn can be reduced.

Solution to Problem

An aspect of the present invention for solving the problem of the conventional example described above includes means for accepting image data representative of a bitmap image and an initial display range that is determined by a predetermined method, setting means for setting a target display range different from the initial display range, rasterization processing means for executing a rasterization process based on the image data with use of information of the set target display range to generate a bitmap image of a size represented by integerized information, and drawing means for drawing the bitmap image generated by the rasterization processing means in the target display range set by the setting means.

Advantageous Effect of Invention

According to the present invention, when animation drawing is performed or in a like case, while increase of the processing load by rasterization is suppressed, deterioration of image data to be drawn can be reduced.

DESCRIPTION OF EMBODIMENT

Figure 1:
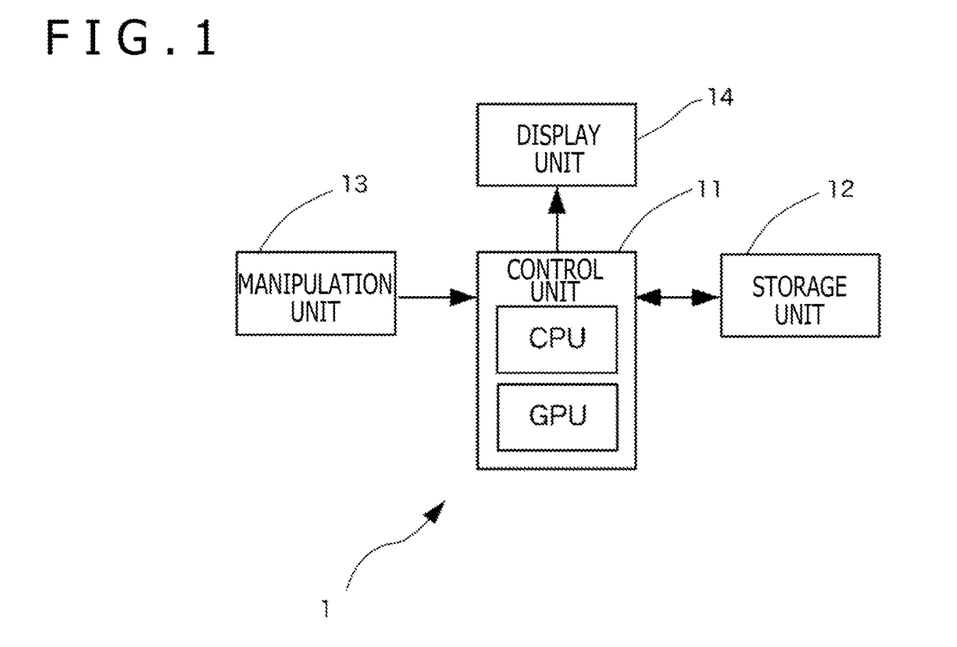
FIG. 1 is a block diagram depicting an example of a configuration of an image processing apparatus according to an embodiment of the present invention.

An embodiment of the present invention is described with reference to the drawings. An image processing apparatus 1 according to the embodiment of the present invention is, for example, a personal computer, a home-use game machine, or a portable terminal such as a smartphone or a tablet and includes a control unit 11, a storage unit 12, a manipulation unit 13, and a display unit 14 as exemplified in FIG. 1.

The control unit 11 includes a program-controlled device such as a CPU (Central Processing Unit) or a GPU (Graphics Processing Unit). The control unit 11 operates according to a program stored in the storage unit 12 and executes processing of an application of, for example, a game. Further, in the process of processing and so forth of various applications, the control unit 11 executes processing of drawing and displaying image data.

In the present embodiment, the control unit 11 accepts image data representative of a bitmap image and a setting of an initial display range determined by a predetermined method and executes a process of drawing a bitmap image represented by the accepted image data in a target display range different from the initial display range and displaying a result of the drawing. This process is an animation drawing process of moving the drawing range, for example, from the initial display range to the target display range and so forth.

The control unit 11 of the present embodiment sets a target display range different from the initial display range. The control unit 11 uses information of the set target display range to execute a rasterization process based on image data of a target of the processing. The control unit 11 generates, by the rasterization process, a bitmap image of a size represented by integerized information. Further, the control unit 11 executes a process of drawing the generated bitmap image in the set target display range. This operation of the control unit 11 is hereinafter described in detail.

The storage unit 12 includes at least one memory device such as a RAM (Random Access Memory). The storage unit 12 stores a program to be executed by the control unit 11 and data to be processed by the program. The storage unit 12 also operates as a work memory of the control unit 11. Here, the program stored in the storage unit 12 may be a program that is stored in and provided as a computer-readable non-transitory recording medium and is replicated in the storage unit 12.

The manipulation unit 13 accepts information representative of manipulation of a user inputted from a keyboard, a mouse, a game controller, or the like. Then, the manipulation unit 13 outputs the information to the control unit 11. The display unit 14 outputs an image to a display, a home-use television set, or the like so as to be displayed according to a designation inputted from the control unit 11. Further, the image processing apparatus 1 of the present embodiment may include communication means for performing communication with a different information processing apparatus or the like through a network or the like.

Figure 2:
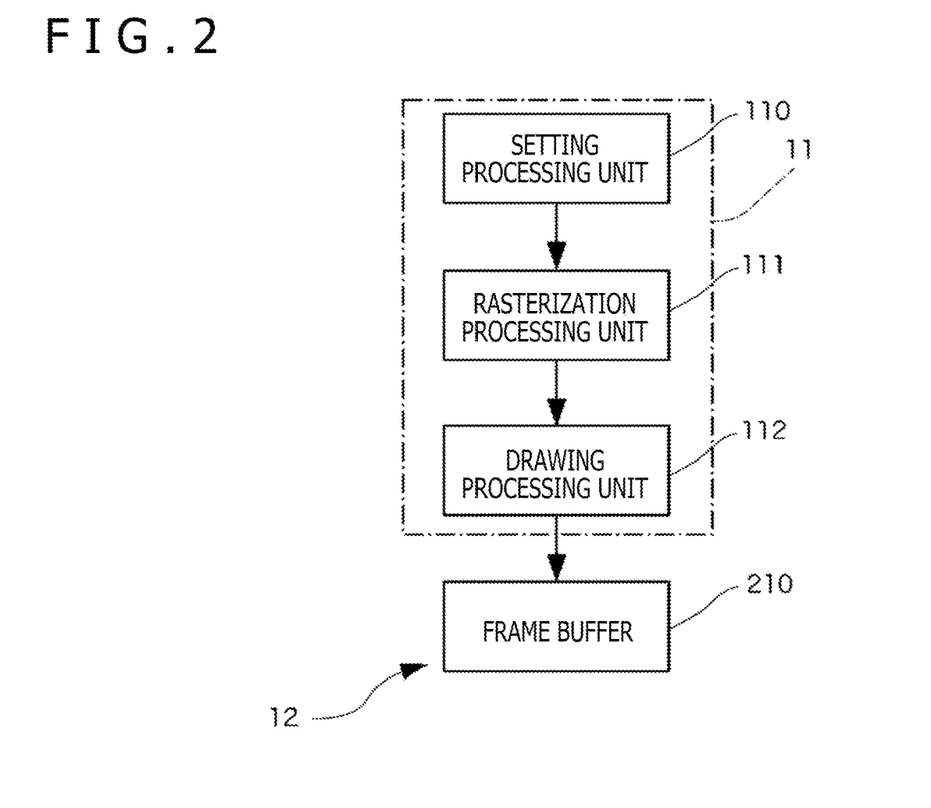
FIG. 2 is a functional block diagram depicting an example of the image processing apparatus according to the embodiment of the present invention.

The control unit 11 of the image processing apparatus 1 of the present embodiment functionally implements such a configuration as exemplified in FIG. 2 by executing a program stored in the storage unit 12. In particular, the control unit 11 functionally includes a setting processing unit 110, a rasterization processing unit 111, and a drawing processing unit 112. Here, in a case where the control unit 11 includes a CPU and a GPU, the setting processing unit 110 and the rasterization processing unit 111 may be implemented by the CPU and the drawing processing unit 112 may be implemented by the GPU.

Further, in the example here of the present embodiment, it is assumed that the storage unit 12 has set therein a storage region for a frame buffer 210 for retaining information of a screen image to be drawn. Further, it is assumed that the image processing apparatus 1 can acquire, as processing of an application, an operating system, or the like, a designation of vector data to be made a target of processing for rasterization and a designation of a display range for the vector data. Here, the vector data corresponds to image data representative of a bitmap image.

In the example described below, the image processing apparatus 1 performs a designation of a display range by processing of the application, operating system, or the like. As a particular example, in the following description, it is assumed that the image processing apparatus 1 first designates a display range (referred to as an initial display range) on the frame buffer 210 as exemplified in FIG. 3(a) and then designates a second display range (referred to as a target display range) scaled from the region of the frame buffer 210 (n FIG. 3, reduced by 60%).

Figure 4:
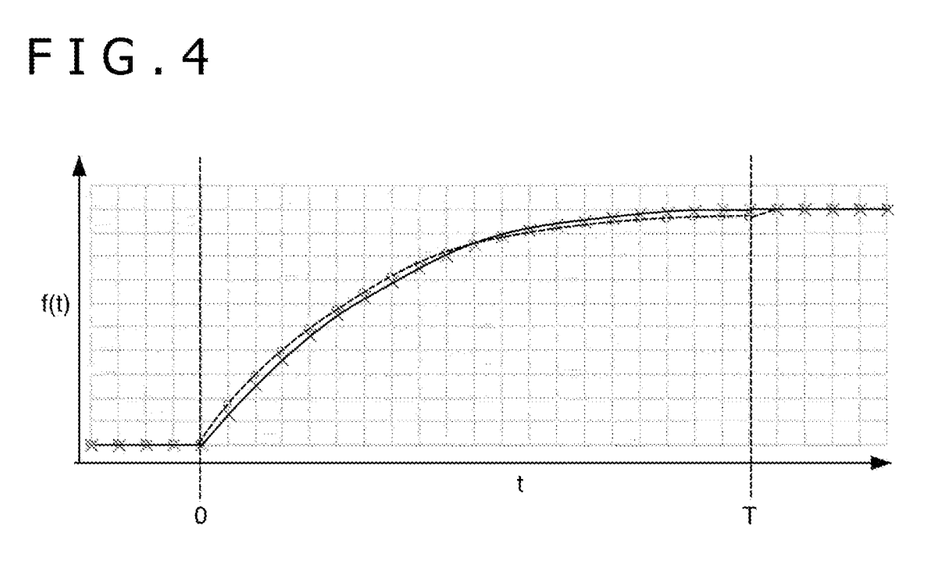
FIG. 4 is an explanatory view depicting an example of an overview of a drawing process of animation performed by the image processing apparatus according to the embodiment of the present invention.

Further, the image processing apparatus 1 may additionally designate, as a process of the application, the operating system, or the like, a function f(t) representative of an amount of change corresponding to lapse of time in order to gradually change (to draw an animation of) the display range from the initial display range to the target display range as time passes. This function (f(t)) is depicted, for example, in FIG. 4. FIG. 4 depicts an example representative of an amount of change of the position and represents an amount of change at every Δt (Δt=T/N (N is a natural number determined in advance)) from time 0 to time T corresponding to a value P0 corresponding to the initial display range to a value P1 corresponding to the target display range, respectively. In this example of FIG. 4, the amount of change is specified such that, while the time t is time near to "0," the position changes comparatively rapidly and, as the time t approaches T, the amount of change decreases.

The setting processing unit 110 sets a display range for the bitmap image acquired by rasterization. In particular, the setting processing unit 110 sets a predetermined region on the frame buffer 210 as a display range, according to a designation inputted from the application, the operating system, or the like.

Figure 3:
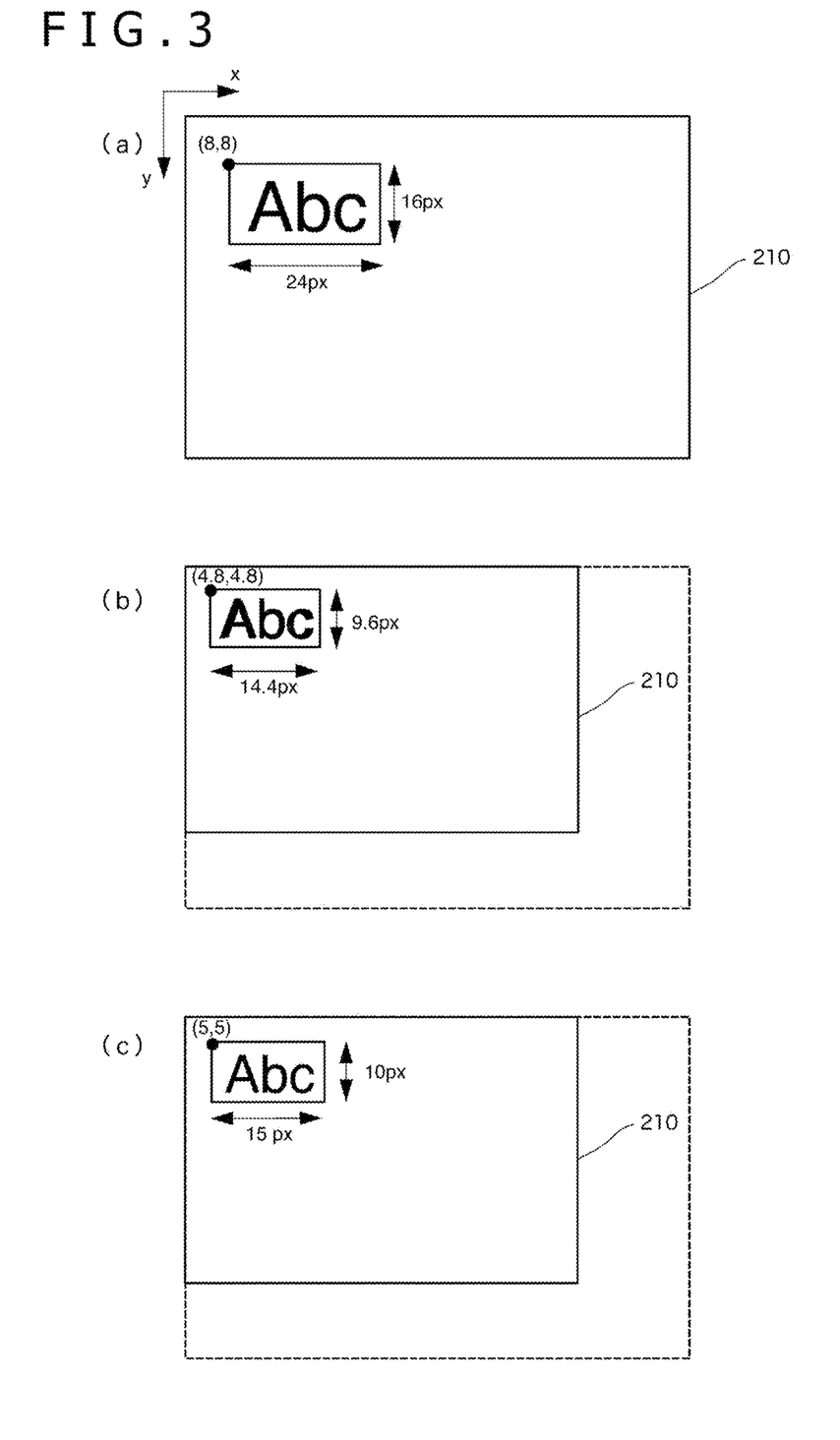
FIG. 3 depicts explanatory views each depicting an example of a drawing process by the image processing apparatus according to the embodiment of the present invention.

In particular, as exemplified in FIG. 3, in a case where the initial display range is, for example, a rectangular region with position coordinates of (8, 8) in the upper left corner, a height of 16 pixels (px), and a width of 24 px, the designation to be inputted is a rectangular region of a size reduced by 60% from that of the initial display range and designates a region with position coordinates of (4.8, 4.8) in the upper left corner, a height of 9.6 pixels (px), and a width of 14.4 px as depicted in FIG. 3(b).

However, in a case where drawing is performed for a region whose position or size is defined by such a value including the decimal point (non-integer value) as given above, a process of what is called subpixel rendering or the like is performed, resulting in deterioration in the image. Therefore, in an example of the present embodiment, the setting processing unit 110 uses an integer value for information of a position (for example, coordinate values of the upper left corner) and a size (width and height) that define a target display range (FIG. 3(c)). As a method for converting a non-integer value including the decimal point into an integer value, widely known methods such as truncation (floor), a rounding method (round), and a rounding up method (ceiling) may be adopted. In the example of FIG. 3(c), an example in which rounding up is performed such that the position coordinates of the upper left corner become (5, 5) and the size becomes a height of 10 px and a width of 15 px is depicted.

In this case, the setting processing unit 110 additionally corrects the function f(t). In particular, according to the designated values, the function f(t) changes from P0=8 (it is assumed that the example of FIG. 4 indicates an example in regard to the X-axis direction) to P1=4.8 (broken line in FIG. 4).

Therefore, the setting processing unit 110 uses the value P'1=5 that is the integerized value of P1 and multiplies each point of the amount of change at every Δt by P'1/P1. As a result, f(t) represents a change indicated by a solid line in FIG. 4.

The rasterization processing unit 111 uses information of a display range set by the setting processing unit 110 to rasterize vector data (image data) designated from the application, the operating system, or the like to generate a bitmap image.

In particular, before the time t=0, the rasterization processing unit 111 performs rasterization of designated vector data of an initial display range (width and height) set by the setting processing unit 110 to generate a bitmap image of the size of the initial display range and outputs the generated bitmap image to the drawing processing unit 112. Further, if the setting processing unit 110 sets a target display range, then the rasterization processing unit 111 performs rasterization of the designated vector data in a region of the size (width and height) of the set target display range to generate a bitmap image of the size of the target display range (size indicated by the integerized information) and outputs the generated bitmap image to the drawing processing unit 112.

The drawing processing unit 112 determines a display range on the frame buffer 210 at every time Δt, according to the function f(t) set (corrected) by the setting processing unit 110. Further, the drawing processing unit 112 expands or reduces the bitmap image outputted from the rasterization processing unit 111 (one of the image drawn to the size of the initial display range and the image drawn to the size of the target display range) to the size of the display range at the time t, and draws the expanded or reduced bitmap image at the position on the frame buffer 210 in the display range at the time t. Here, it is assumed that, although, while the time t is within the range of 0<t<T, the size sometimes becomes a non-integer including the decimal point, during animation drawing (while the size is changing with time), scaling to a size of a non-integer is performed.

Further, although the drawing processing unit 112 selects, as a bitmap image to be utilized for scaling, from between bitmap images outputted from the rasterization processing unit 111, a bitmap image drawn in the initial display range (initial bitmap image) and a bitmap image drawn in the target display range (final bitmap image), this selection may be performed such that it is switched such that, within the period of time $0 \le t << tc$ ($tc \le T$), the initial bitmap image is selected, but within the period of time $0 < tc \le t \le T$ after time tc, the final bitmap image is selected, and thereafter, the final bitmap image is selected.

In the present embodiment, the drawing processing unit 112 determines the timing tc for the switching in the following manner. In particular, the drawing processing unit 112 calculates the difference in value after every unit time $\Delta t$ of the function f(t) (f(t)−f(t−$\Delta t$), where (t≥$\Delta t$>0)). In short, the drawing processing unit 112 differentiates f(t). Then, the drawing processing unit 112 obtains tm at which the difference is in the maximum (or exceeds a predetermined threshold value) (point of time at which the amount of change of f(t) per unit time indicates the highest value).

Here, if the difference is equal at any t, the drawing processing unit 112 sets tc=T. On the other hand, when obtaining time tm at which the difference is in the maximum (or exceeds the predetermined threshold value) by the method described above, the drawing processing unit 112 sets tc=tm. It is to be noted that, in a case where a plurality of values of tm are obtained, the drawing processing unit 112 sets tc=tm with use of time tm selected by a given method from among the plurality of values (for example, earliest time, latest time, or time at random).

According to this example of the present embodiment, when the change in position or size of an image is comparatively fast, replacement of a bitmap image is performed such that the user is less likely to have a sense of discomfort caused by the replacement.

[Operation]

The embodiment of the present invention basically has such a configuration as described above and operates in the following manner.

The image processing apparatus 1 of the present embodiment outputs, as a process of the application, the operating system, and so forth, a designation of vector data (image data) to be made a target of rasterization and a designation of a display range of the vector data and additionally designates the function f(t) representative of a time change of the display range from the initial display range to the target display range. The function f(t) is designated for each of an X coordinate value and a Y coordinate value of a position, and a value of a width and a value of a height of a size.

In the following description, it is assumed that this function f(t) is specified such that, for any of the values, it changes comparatively rapidly at time at which the time t is near to "0" and the amount of change decreases as the time t approaches T (animation ending point of time), as exemplified in FIG. 4.

As the process of drawing based on vector data, the image processing apparatus 1 sets, as a display range, a predetermined region defined by a position and a size represented by integer values on the frame buffer 210, according to a designation inputted from the application, the operating system, or the like.

In particular, the following example is indicated. Assuming that the initial display range is, for example, a rectangular region with position coordinates of (8, 8) in the upper left corner, a height of 16 pixels (px), and a width of 24 px, in a case where the rectangular region is reduced by 60%, the position coordinates of the upper left corner become (5, 5) and the size becomes 10 px high and 15 px wide.

At this time, the image processing apparatus 1 also corrects each of the functions f(t) such that, using the integerized value P'1=5, each point of the amount of change at every $\Delta t$ of each function f(t) is multiplied by 5/(4.8) times.

Further, the image processing apparatus 1 rasterizes vector data (image data) designated from the application, the operating system, or the like with use of the information of the display range set with the integer values to generate a bitmap image. In particular, before the time t=0, the image processing apparatus 1 performs rasterization of designated vector data of the initial display range (width and height) set at the time to generate a bitmap image of the size of the initial display range.

Further, if a target display range different from this initial display range is set, then the image processing apparatus 1 performs rasterization of designated vector data in a region of the size (width and height) of the set target display range to generate a bitmap image of the size of the target display range.

The image processing apparatus 1 determines a display range on the frame buffer 210 at every time $\Delta t$, according to the function f(t) set (corrected) as above. The image processing apparatus 1 selects, as an image to be drawn at the point of time of each time $\Delta t$, one of the bitmap image of the size of the initial display range and the bitmap image of the size of the target display range.

In the example here of the present embodiment, the image processing apparatus 1 uses the bitmap image of the size of the initial display range till a point of time at which the amount of change of f(t) per unit time becomes greatest. After the point of time, the image processing apparatus 1 performs drawing using the bitmap image of the size of the target display range. As described already, since the amount of change of f(t) per unit time becomes greater as t approaches 0, the image processing apparatus 1 performs drawing using the bitmap image of the size of the target display range after a point of time immediately after the drawing of animation is started (point of time of t=$\Delta t$).

In particular, in the example here, the image processing apparatus 1 expands or reduces, sequentially at every $\Delta t$, the bitmap image of the size of the target display range to the size of the display range at the time t and draws the expanded or reduced bitmap image at a position on the frame buffer 210 in the display range at the time t. Here, although, while the time t is within the range of 0<t<T, the size sometimes becomes a non-integer including the decimal point, during animation drawing (while the size is changing with time), the image processing apparatus 1 performs scaling to a size of a non-integer.

Then, when t=T is reached, the image processing apparatus 1 draws a bitmap image rasterized in the region of the size of the target display range (integerized size) at the position of the target display range (integerized position) in the size of the target display range (integerized size). Consequently, in the screen image after the animation drawing ends (after reduction by 60%), a bitmap image with comparatively little deterioration is drawn.

Further, since the function f(t) that defines the change up to the size of the target display range is corrected on the basis of the position or the size of the target display range, the change during animation drawing is also displayed without giving an uncomfortable feeling.

[Example in which Error in Integerization is Corrected]

The following is to be noted when information that defines a position or a size is integerized in such a manner as described above. If, in a case where a plurality of bitmap images are acquired by the rasterization process, the differences in value from that before the integerization are different from each other when a process for integerization related to individual bitmap images is performed, then, when the bitmap images are arrayed, the array may give an uncomfortable feeling.

For example, when same reduction by 60% is to be performed, in a case where there are a bitmap image A of which the X coordinate of the original position is 8 px (the X coordinate after reduction is, in a non-integer state, 4.8 px and is, when integerized by rounding, 5 px) and a bitmap image B of which the X coordinate of the original position is 24 px (the X coordinate after reduction is, in a non-integer state, 14.4 px and is, when integerized by rounding, 14 px), an error by integerization of the bitmap image A (value when the value before integerization is subtracted from the value after the integerization) is −0.2 px, and an error by integerization of the bitmap image B is +0.4 px. Accordingly, if the bitmap image A and the bitmap image B are arrayed, then the distance between the images looks increasing by 0.6 px, which sometimes causes an uncomfortable feeling.

Therefore, in an example of the present embodiment, when the setting processing unit 110 integerizes information of a position (for example, coordinate values of the upper left corner) and a size (width and height) that define a target display range of a rasterized bitmap image and sets the integerized information, the setting processing unit 110 outputs, together with the information of the position and the size of integerized values, information of the difference (error) between the value before the integerization and the value after the integerization.

A particular example is described in connection with the example of FIG. 3. In a case where a rectangular region with position coordinates of (8, 8) in the upper left corner, a height of 16 pixels (px), and a width of 24 px is reduced by 60% to form a target display range, the position coordinates of the upper left corner before the integerization are (4.8, 4.8). On the other hand, in a case where integerization is performed to set the position coordinates of the upper left corner to (5, 5) and set the size to 10 px high and 14 px wide, the setting processing unit subtracts the values before the integerization from the values after the integerization to obtain (−0.2, −0.2), which is an error in the value of the position coordinates, and outputs the information of the error in position to the rasterization processing unit 111 and the drawing processing unit 112 together with the values after the integerization (information that defines the target display range).

Further, the rasterization processing unit 111 of this example uses information of the target display range set by the setting processing unit 110 to rasterize vector data (image data) designated from the application, the operating system, or the like to generate a bitmap image. Since this operation of the rasterization processing unit 111 is same as that described hereinabove, overlapping description of this is omitted here.

In particular, the rasterization processing unit 111 of this example performs rasterization of the designated vector data in a region of the set target display range size (width and height) to generate a bitmap image and outputs the generated bitmap image to the drawing processing unit 112.

The drawing processing unit 112 determines a display range for the bitmap image on the frame buffer 210 at every time Δt, according to the function f(t) set by integerization of the display range by the setting processing unit 110 and the information of the error.

Also in the example here of the present embodiment, the drawing processing unit 112 expands or reduces the bitmap image outputted from the rasterization processing unit 111 (one of the initial bitmap image and the target bitmap image is selected) to the size of the display range at the time t and draws the expanded or reduced bitmap image at the position of the display range on the frame buffer 210 at the time t. This selection may be performed similarly to that described hereinabove.

One of characteristics of this example of the present embodiment is that, after the drawing processing unit 112 provisionally determines a drawing position for a rasterized image on the basis of the function f(t) set by integerization of the display range, the provisionally determined position is corrected on the basis of information of the error and a rasterized image is drawn at the position after the correction.

That is, the drawing processing unit 112 determines the position after the correction with use of the function f(t) and information d0 of an error related to the corresponding initial display range (information of the error of the display range at the time t=0) or information d1 of the error related to the target display range.

In particular, while the initial bitmap image is selected and drawn on the frame buffer 210, the drawing processing unit 112 determines the coordinates p(x, y) of the upper left corner as p(x, y)=(fx(t), fy(t))−(dx0, dy0). Here, fx(t) represents the value of the function f(x) related to the position in the x-axis direction of the upper left corner of the display range, and fy(t) represents the value of the function f(t) related to the position in the y-axis direction of the upper left corner of the display range. Meanwhile, dx0 is information of the error in the x-axis direction related to the initial display range, and dy0 is information of the error in the y-axis direction related to the initial display range. (dx0, dy0)=(int[fx(O), fy(O)]−(fx(O), fy(O)) Here, int[X, Y] signifies to convert each of X and Y into an integer by a predetermined method (truncation, rounding, rounding up, or the like).

Further, while selecting a target bitmap image and drawing it on the frame buffer 210, the drawing processing unit 112 determines the coordinates p(x, y) of the upper left corner as p(x, y)=(fx(t), fy(t))−(dxT, dyT). Here, fx(t) represents a value of the function f(t) related to the position in the x-axis direction of the upper left corner of the display range, and fy(t) represents a value of the function f(t) related to the position in the y-axis direction of the upper left corner of the display range. Further, dxT is information of an error in the x-axis direction related to the target display range, and dyT is information of an error in the y-axis direction related to the target display range. That is, (dxT, dyT)=(int[fx(T), fy(T)]−(fx(T), fy(T))).

In the example of FIG. 3, the information of the error related to the initial display range is (dx0, dy0)=(0, 0), and the information of the error related to the target display range is (dxT, dyT)=(−0.2, −0.2).

According to this example, at the point of time at which animation drawing comes to an end, drawing is performed at a position represented by non-integer values with an error of integerization taken into consideration (as a method for drawing a given bitmap image in a region on a frame buffer represented by non-integer values, a method widely known as a subpixel drawing method can be adopted). In this example, the image processing apparatus 1 draws a target bitmap image rasterized in a region of the size of the target display range (integerized size) in the size of the target display range (integerized size) at a position corrected by an amount of the error from the target display range (non-integer position). In this example, in a case where a plurality of rasterized images are deployed, the distance between them can be maintained. Further, since a bitmap image rasterized in the integer region is used, as a screen image after animation drawing ends (after reduction by 60%), a bitmap image having comparatively little deterioration can be displayed.

[Further Example of Drawing Compatible with Size Change]

Further, in the examples so far of the present embodiment, when animation drawing in which the size is changed is performed, the drawing processing unit 112 selects and scales one of the initial bitmap image or the target bitmap image to draw the selected and scaled initial bitmap image or target bitmap image in a frame buffer. However, the present embodiment is not limited to this.

In particular, in an example of the present embodiment, the drawing processing unit 112 may combine, during animation drawing during which at least the size of the bitmap image is changed (where animation drawing from t=0 to t=T is performed, during a period of 0<t<T), the initial bitmap image and the target bitmap image such that they crossfade with each other to draw them in a display range determined at each point of time.

In particular, the drawing processing unit 112 expands or reduces, at the time t (0<t<T), the initial bitmap image and the target bitmap image to the size of the display range at the time t, and uses pixel values C0 (x, y) and CT(x, y) of corresponding pixels in the bitmap images after being expanded or reduced to determine the value C(x, y) of the corresponding pixel of the bitmap image after the combination at the time t as C (x, y)=(C0(x, y)×(T−t)+Ct (x, y)×t)/T.

(It is to be noted that C is generally a vector quantity representative of a value of a color space including values of RGB and an alpha channel representative of transparency.)

In this case, when correction of the position on the basis of information of the error is to be performed further, for example, during the period of 0≤t<T/2, the coordinates of the upper left corner of the display range may be set to p (x, y)=(fx (t), fy(t))−(dx0, dy0), and during the period of T/2≤t≤T, the coordinates of the upper left corner of the display range may be set to p (x, y)=(fx (t), fy (t))−(dxT, dyT).

In this example, since the difference in resolution between the initial bitmap image and the target bitmap image is blunted, animation drawing that can be viewed comparatively smoothly is performed.

REFERENCE SIGNS LIST

1: Image processing apparatus
11: Control unit
12: Storage unit
13: Manipulation unit
14: Display unit
16: Height
110: Setting processing unit
111: Rasterization processing unit
112: Drawing processing unit
210: Frame buffer

The invention claimed is:

1. An image processing apparatus, comprising:
circuitry configured to
accept image data and an initial display range that is determined by a predetermined method;
set a target display range different from the initial display range, the target display range having a size that is different from a size of the initial display range. the target display range being defined by integer values, the initial display range being defined in non-integer values;
execute a rasterization process based on the image data to generate an initial bitmap image corresponding to the initial display range;
execute the rasterization process on the image date to generate a target bitmap image corresponding to the target display range; and
generate a plurality of scaled bitmap images from at least one of the initial bitmap image or the target bitmap image based on a predetermined function that defines a scaling of bitmap images between the initial bitmap image and the target bitmap image; and
sequentially draw the initial bitmap image, the plurality of scaled bitmap images, and the target bitmap image as an animation from the initial bitmap image to the target bitmap image over time.

2. The image processing apparatus according to claim 1, wherein the animation is divided into a plurality of time steps from an initial time $t_0$ to a final time T, and the circuitry displays the initial bitmap at time to, displays the target bitmap at time T, and displays a different one of the plurality of scaled bitmap images at each of the plurality of time steps between to and T.

3. The image processing apparatus according to claim 2, wherein the predetermined function is a non-linear function.

4. The image processing apparatus according to claim 2, wherein a first subset of the plurality of scaled bitmap images are generated by scaling the initial bitmap image, and a second subset of the plurality of scaled bitmap images are generated by scaling the target bitmap image.

5. The image processing apparatus according to claim 4, wherein the first subset of the plurality of scaled bitmap images are generated for time steps in which the predetermined function results in a greatest scaling change.

6. The image processing apparatus according to claim 5, wherein the second subset of scaled bitmap images are generated for time steps in which the predetermined function results in a smallest scaling change.

7. The image processing apparatus according to claim 6, wherein the scaling change is determined as a derivative of the predetermined function.

8. The image processing apparatus according to claim 4, wherein the first subset of scaled bitmap images is generated for time steps in which the predetermined function results in a scaling change that exceeds a predetermined threshold.

9. The image processing apparatus according to claim 8, wherein the second subset of scaled bitmap images is generated for time steps in which the predetermined function results in a scaling change that is below the predetermined threshold.

10. The image processing apparatus according to claim 1, wherein the image data is vector image data.

11. The image processing apparatus according to claim 1, wherein the scaling of bitmap images between the initial bitmap image and the target bitmap image includes non-integer scaling.

12. The image processing apparatus according to claim 1, wherein when chosen dimension values of the target display range are not integers, the circuitry rounds the chosen dimension values to obtain the integer values that define the target display range.

13. The image processing apparatus according to claim 12, wherein the circuitry rounds the chosen dimension up to a next largest integer.

14. The image processing apparatus according to claim 1, wherein when chosen dimension values of a target display range are not integers, the circuitry truncates the chosen dimension values to obtain the integer values that define the target display range.

15. The image processing apparatus according to claim 1. wherein the initial display range and the target display range are defined in terms of a number of pixels.

16. The image processing apparatus according to claim 15, wherein the number of pixels includes a number of pixels in width and a number of pixels in length.

17. An image processing method, comprising:
accepting, by circuitry, image data and an initial display range that is determined by a predetermined method;
setting, by the circuitry, a target display range different from the initial display range, the target display range having a size that is different from a size of the initial display range, the target display rage being defined by integer values, the initial display range being device by non-integer values:
executing, by the circuitry, a rasterization process based on the image data to generate an initial bitmap image corresponding to the initial display range;
executing, by the circuitry, the rasterization process based on the image data to generate a target bitmap image corresponding to the target display range;
generating, with the circuitry, a plurality of scaled bitmap images from at least one of the initial bitmap image or the target bitmap image based on a predetermined function that defines a scaling of bitmap images between the initial bitmap image and the target bitmap image; and
sequentially drawing, by the circuitry, the initial bitmap image, the plurality of scaled bitmap images. and the target bitmap image as an animation from the initial bitmap image to the target bitmap image over time.

18. A non-transitory computer readable medium having stored thereon computer readable instructions that, when executed by a computer, cause the computer to perform a method, comprising:
accepting image data and an initial display range that is determined by a predetermined method;
setting a target display range different from the initial display range, the target display range having a size that is different from that of the initial display range, the target display range being defined by integer values, the initial display range being defined by non-integer values;
executing a rasterization process based on the image data to generate an initial bitmap image corresponding to the initial display range;
executing the rasterization process based on the image data to generate a target bitmap image corresponding to the target display range;
generating a plurality of scaled bitmap images from at least one of the initial bitmap image or the target bitmap image based on a predetermined function that defines a scaling of bitmap images between the initial bitmap image and the target bitmap image; and
sequentially drawing the initial bitmap image, the plurality of scaled bitmap images, and the target bitmap image as an animation from the initial bitmap image to the target bitmap image over time.

* * * * *